March 4, 1969 T. J. BRIDGES ET AL 3,431,489
NULL COIL PENDULUM MAGNETOMETER WITH MEANS FOR ESTABLISHING AN
ALTERNATING MAGNETIC FLUX GRADIENT THROUGH THE NULL COIL
Filed March 14, 1966 Sheet 1 of 2

INVENTORS: T.J. BRIDGES
C.F. HEMPSTEAD
BY
Roderick B. Anderson
ATTORNEY

# United States Patent Office 3,431,489
Patented Mar. 4, 1969

3,431,489
NULL COIL PENDULUM MAGNETOMETER WITH MEANS FOR ESTABLISHING AN ALTERNATING MAGNETIC FLUX GRADIENT THROUGH THE NULL COIL
Thomas J. Bridges, Bernardsville, and Charles F. Hempstead, Millington, N.J., assignors to Bell Telephone Laboratories, Incorporated, New York, N.Y., a corporation of New York
Filed Mar. 14, 1966, Ser. No. 534,207
U.S. Cl. 324—34                                                            7 Claims
Int. Cl. G01r 33/00; G01n 27/00

This relates to apparatus for measuring the magnetic moments of small specimens, and more particularly, to null coil pendulum magnetometers.

The conventional null coil pendulum magnetometer is a device for measuring small magnetic moments in material samples and comprises a pendulum with a coil at its free end which contains the sample. The sample in the coil is located in a non-uniform magnetic field which produces a force on it in one direction if the sample is paramagnetic, and in another direction if it is diamagnetic. The pendulum is then restored to its equilibrium position by current through the coil for producing a magnetic moment that compensates for the magnetic moment of the sample. By measuring the current required for restoring the pendulum to its equilibrium position, one can determine the magnetic moment of the sample. More detailed descriptions of null coil pendulum magnetometers are given in "A Null-Coil Magnetometer" by Jongenburger and Berghout, Applied Scientific Research, sec. B, vol. 7, p. 366, 1959, and "Magnetic Properties of Some Orthoferrite and Cyanides at Low Temperatures" by Bozorth, Williams, and Walsh, Physical Review, vol. 103, No. 3, p. 572, Aug. 1, 1956.

The magnetic field gradient is usually produced by a pair of electromagnet pole pieces that are tapered with respect to the plane of the magnetometer coil or "null coil." The amount of taper, and thus the field gradient, is chosen in advance to give a useful deflection of the magnetometer pendulum under most experimental conditions. While the device is operable over a usefully large range, it has several shortcomings: it is difficult to determine the precise null point of the pendulum, causing thereby a problem known as D.C. drift; spurious vibrations and mechanical errors in the apparatus cause inaccurate measurements; the magnitude of the gradient depends on the field intensity, so that at low magnetic fields the gradient becomes small and sensitivity decreases rapidly; at high magnetic fields, the pole pieces tend to saturate and the gradient again decreases, causing non-linearities and inaccuracies.

It is therefore an object of this invention to increase the sensitivity and accuracy of null coil pendulum magnetometers.

This and other objects of the invention are attained in a null coil pendulum magnetometer, the null coil of which is located between plane parallel pole pieces which produce a uniform magnetic field with no field gradient. In accordance with the invention, the magnetic field gradient for displacing the pendulum is produced by a pair of alternating current excited coils on opposite sides of the null coil. These gradient-producing coils are excited by current having a frequency equal to that of the natural mechanical resonant frequency of the pendulum. Hence if the sample has a discernible magnetic moment the periodic magnetic field gradient exerts forces at the pendulum resonant frequency and therefore excites oscillations of the pendulum. The magnetic moment of the sample is determined by measuring the current required by the null coil to compensate for the magnetic moment of the sample and thereby return the pendulum to an equilibrium or non-oscillating position. The oscillation of the pendulum is detected by auxiliary apparatus.

Our apparatus increases magnetometer sensitivity because it makes the pendulum oscillate with growing amplitude rather than merely deflecting it. Hence, the apparatus is made more sensitive to the magnetic moment of the sample without being more sensitive to spurious vibrations and other "noise." Further, since the gradient-producing coils are independent of the magnetic pole pieces, a substantially constant and linear gradient across the null coil can be maintained regardless of the intensity of the magnetic field produced between the pole pieces.

These and other objects, features and advantages of the invention will be better appreciated from a consideration of the following detailed description taken in conjunction with the accompanying drawing in which.

Figure 1:
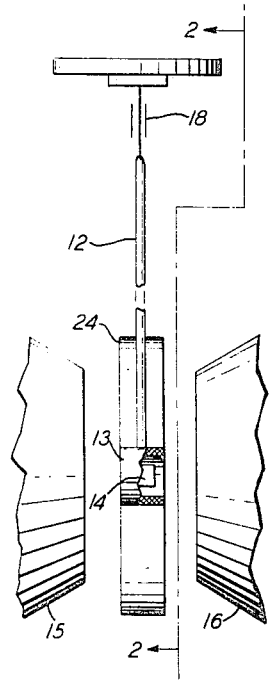
FIG. 1 is a schematic view of a null coil pendulum magnetometer in accordance with an illustrative embodiment of the invention.
Figure 2:
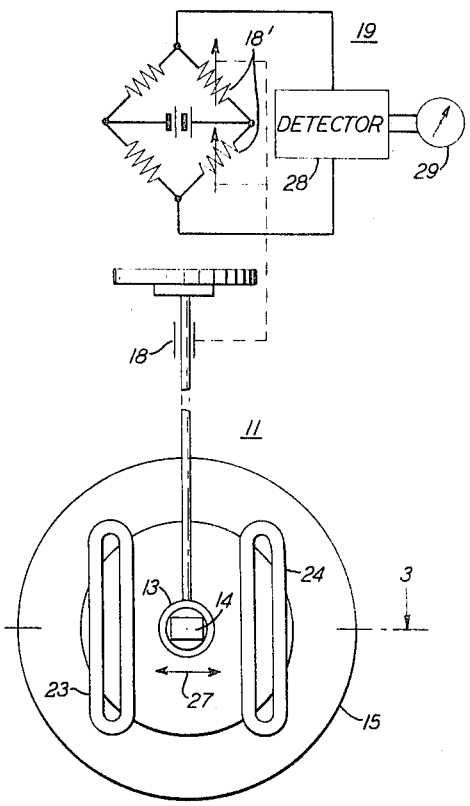
FIG. 2 is a view taken along lines 2—2 of FIG. 1 and further including a pendulum null detector circuit.
Figure 3:
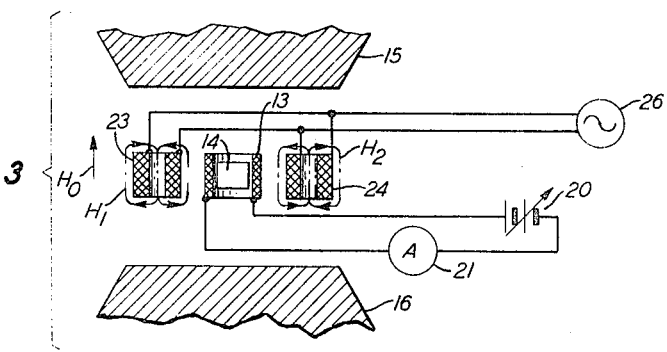
FIG. 3 is a view taken along lines 3—3 of FIG. 2 and further including a null coil balancing circuit.

Referring now to FIGS. 1, 2, and 3, there is shown a null coil pendulum magnetometer 11 comprising a pendulum 12 having at its free end a null coil 13 which contains a sample 14 the magnetic moment of which is to be ascertained. The coil 13 is located between magnetic pole pieces 15 and 16. Included near the fixed end of the pendulum 12 is a pair of matched strain gauges 18 that is responsive to displacements of the pendulum. As shown diagrammatically in FIG. 2, the strain gauges 18 effectively constitute a pair of variable resistors 18' in a circuit 19 for detecting the null of the pendulum. As is known, the magnetic moment to be measured is a function of the magnetic field to which the sample is subjected.

Referring to FIG. 3, a variable direct current source 20 is connected to the null coil 13 through an ammeter 21 for the purpose of counterbalancing the forces due to the magnetic moment of sample 14. All of the elements thus far described are used in conventional known null coil pendulum magnetometers, except that the facing surfaces of the pole pieces 15 and 16 are parallel for establishing a uniform magnetic field across the null coil, rather than being tapered for producing a magnetic field gradient. In accordance with our invention, a pair of gradient coils 23 and 24 are located on opposite sides of the null coil 13 for producing the required magnetic field gradient. The gradient coils 23 and 24 are excited by an alternating current source 26 having a frequency substantially equal to the natural mechanical resonance frequency of the pendulum 12.

Any ferromagnetic, paramagnetic, or diamagnetic material located in the magnetic field will exhibit a magnetic moment. If the magnetic material is located in a magnetic field gradient, a force will be exerted on it in the direction of the gradient which is proportional to the product of the gradient and the magnetic moment. In our magnetometer the forces on the sample 14 displace the pendulum as shown by the arrow 27 of FIG. 2. Since the gradient coils 23, 24 of FIG. 2 are excited at a frequency equal to the resonance frequency of the pendulum, the field gradient is a periodic function, and the forces on the sample alternate and excite mechanical oscillations of the pendulum. Movement of the pendulum is detected by the strain gauges 18 which unbalance the bridge circuit to cause current to flow through an A.C. detector 28 to deflect a meter 29.

After the meter 29 is deflected, the variable source 20 of FIG. 3 is adjusted to supply current to the null coil 13. Since the null coil current creates a small magnetic field component, it also creates a magnetic moment in the null coil. Accordingly, the magnetic field gradient produces a force on the null coil 13. By adjusting the magnitude and direction of the current through the null coil, the forces on the null coil can be made to be equal and opposite to the forces on the sample 14, which results in a zero net force on the sample plus null coil. During the adjustment process, the net force can be made to have either a zero or 180 degree phase relationship to any existing pendulum motion. This adjustment procedure thus will stop the oscillation of the pendulum. The magnitude and direction of the current of the null coil required for bringing the pendulum to a null is a function of the magnetic moment of the sample 14. Hence, the ammeter 21 may be graduated to give a direct reading of the magnetic moment of the sample that is tested. The meter 29 of FIG. 2, of course, indicates to the operator the null condition of the pendulum.

Figure 4:
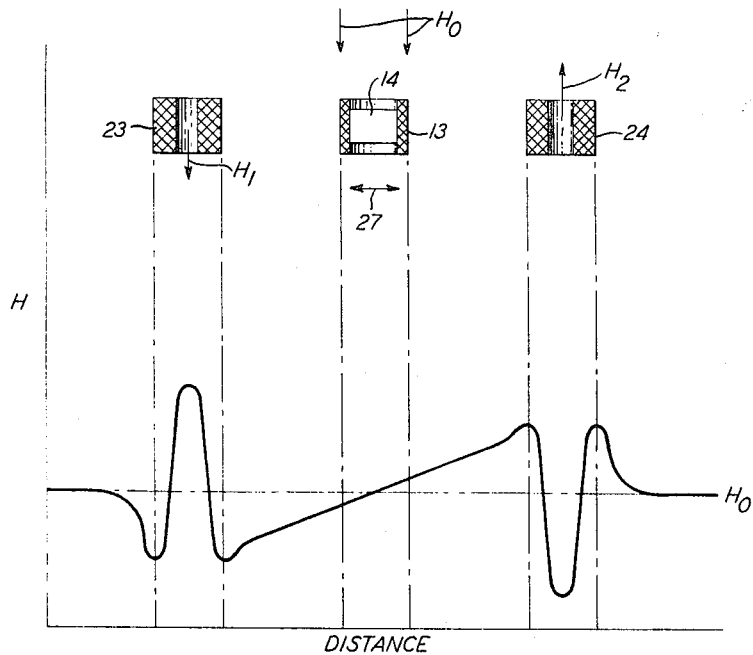
FIG. 4 is a graph of magnetic flux intensity versus distance in the device of FIG. 1.

Since the forces on the sample and on the coil are both equal to the product of the respective magnetic moments and the magnetic field gradient, and since the magnetic moment produced in a coil by a small current is readily ascertainable, it is well within the skill of a worker in the art to determine the magnetic moment of the sample 14 by the current indicated by ammeter 21. These well known relations are only true, however, if the gradient across the null coil is substantially linear. It is preferred, therefore, that the flux gradient produced by coils 23 and 24 have approximately the characteristic shown in FIG. 4.

The coils 23 and 24 are wound and electrically connected to produce field components $H_1$ and $H_2$ in opposite directions at any instant in time. The uniform magnetic field produced by pole pieces 15 and 16 is designated at $H_0$. With the coils 23 and 24 located in a plane that is parallel with the faces of the pole pieces, and with an appropriate spacing with respect to the null coil 13, the induced flux gradient will be linear in the region of the null coil as is shown by the graph of field intensity versus distance. If the gradient is not substantially linear in the region of the null coil, the force on the coil is a non-linear function of the gradient, and the interpretation of the current for giving a null is more complicated. The spacing and size of the coils 23 and 24, and the currents that are used in them, are matters of design within the ordinary skill of the worker in the art.

Figure 5:
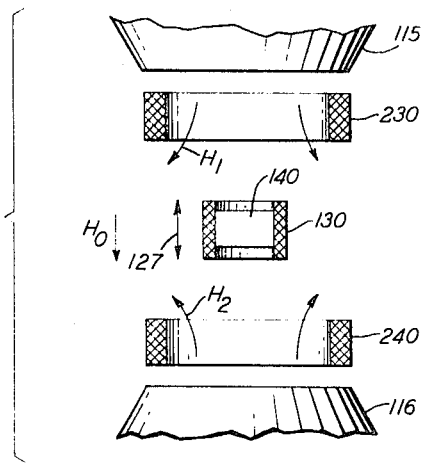
FIG. 5 is a schematic view of a null coil pendulum magnetometer in accordance with another embodiment of the invention.

FIG. 5 shows an alternative embodiment of the invention in which gradient coils 230 and 240 are respectively mounted between the null coil 130 and the pole pieces 115 and 116. Again, the gradient coils are wound and electrically connected so that at any instant in time they produce field intensities $H_1$ and $H_2$ in opposite directions. In this case, the field gradient extends in the same direction as $H_0$ instead of being normal to $H_0$ so that the alternating forces cause the pendulum to swing in a direction parallel to $H_0$ and shown by the arrow 127. The gradient coils 230 and 240 are again excited with alternating current at the same frequency as the mechanical resonance frequency of the pendulum, and the magnetic movement of the sample 140 is ascertained by observing the current required through null coil 130 for bringing the pendulum back to a null.

The embodiment of FIG. 5 may in some cases be advantageous because the coils 230 and 240 can be mounted on the pole pieces 115 and 116, thereby reducing alignment and support problems. It may also be easier to obtain the constant gradient in the region of the null coil with the embodiment of FIG. 5. However, the axis of the null coil 130 of FIG. 5 does not remain parallel with $H_0$ when the pendulum is deflected substantially; this may tend to introduce spurious torques in the pendulum system and so this embodiment may not always be preferable.

For purposes of brevity, may of the details of null coil magnetometers that are known in the art have not been shown nor described. For example, the pendulum may be encased by a Dewar that contains a liquified gas for cooling the sample. The construction of the strain gauges 18 which essentially act as variable resistors 18' in detection circuit 19 is well known. Of course, in our magnetometer, the pendulum oscillates, which in turn generates an alternating current in the detector circuit 19, so that detector 28 should be constructed to detect the amplitude of the alternating current. This again is a matter within the ordinary skill of a worker in the art.

It can be appreciated that, by using gradient coils excited at the same frequency as the mechanical resonant frequency of the pendulum, the sensitivity, accuracy, and flexibility of the magnetometer is substantially increased. Extremely small magnetic moments can be detected because the resonance effect of the pendulum tends to amplify pendulum deflection. Spurious forces that might tend to deflect the pendulum in one direction or the other, give only minimal interference because these forces are not oscillatory at the pendulum frequency. Because the gradient coils are independent of the pole pieces, the magnitude of the alternating gradient can be tailored as desired without thereby changing the uniform component $H_0$. This effectively increases the range of magnetic moments that can be detected and measured.

It is to be understood that the embodiments shown have been presented merely for purposes of illustration and that other embodiments can be made. For example, other mechanically resonant structures, such as a vibrating reed, can be substituted for the pendulum. Other transducers, such as piezoelectric elements, moving coils, optical devices, etc., could be substituted for the strain gauges 18. Various other modifications and embodiments can be made without departing from the spirit and scope of the invention.

What is claimed is:

1. In a null coil magnetometer of the type comprising a mechanical resonant structure having two ends one end connected to a detecting device and having a null coil at the other end for containing a material sample, the magnetic moment of which is to be ascertained, said null coil being connected to a source of current, the improvement comprising:

first magnetic means for establishing a substantially uniform magnetic field through the null coil thereby imparting a magnetic moment to the sample;

and second magnet means for establishing an alternating magnetic flux gradient through the null coil to exert a force on the sample.

2. The improvement of claim 1 wherein:

the frequency of the alternating flux gradient is substantially equal to the natural frequency of oscillation of the mechanical resonant structure.

3. The improvement of claim 2 wherein:

the second magnet means comprises a pair of coils on opposite sides of the null coil for producing said alternating flux gradient;

said gradient producing coils being so wound and connected to a common alternating current source to produce magnetic fields having instantaneous opposite directions.

4. The improvement of claim 3 wherein:

the first magnet means comprises a pair of magnetic pole pieces having substantially parallel planar facing surfaces.

5. The improvement of claim 4 wherein the null coil and the gradient producing coils all lie in a plane which is substantially parallel to the planar surfaces and between the planar surfaces.

6. The improvement of claim 4 wherein:
the gradient producing coils each are located between the null coil and one of the magnetic pole pieces.

7. The improvement of claim 4 wherein:
the second magnet means comprises means for establishing a flux gradient which, in the region of the null coil, is substantially linear with respect to distance.

References Cited

Hutchison et al.: An Electrodynamic Balance for Measuring Magnetic Susceptibilities, Journal of Scientific Instruments, vol. 23, pp. 209–211, September 1946.

Domenicali, C.: A Null Coil Pendulum Magnetometer, Review of Scientific Instruments, vol. 21, No. 4, April 1950, pp. 327–329.

Arrott et al.: Principle for Null Determination of Magnetization and Its Application to Cryogenic Measurements, Review of Scientific Instruments, vol. 28, No. 2, February 1957.

Singer, J.: Magnetic Susceptibility Balance Using a Null Technique, Review of Scientific Instruments, vol. 30, No. 12, December 1959.

RUDOLPH V. ROLINEC, *Primary Examiner.*

R. J. CORCORAN, *Assistant Examiner.*

U.S. Cl. X.R.

324—14